United States Patent [19]

Ladney, Jr.

[11] 4,185,060
[45] Jan. 22, 1980

[54] METHOD OF MANUFACTURING STRUCTURAL FOAM PLASTIC PRODUCTS FREE FROM UNDESIRABLE CONTAMINANT CONSTITUENTS

[76] Inventor: Michael Ladney, Jr., 18125 E. Ten Mile Rd., East Detroit, Mich. 48021

[21] Appl. No.: 887,616

[22] Filed: Mar. 17, 1978

[51] Int. Cl.$^2$ .......................................... B29D 27/00
[52] U.S. Cl. ........................................ 264/54; 264/68; 264/176 R; 264/329; 264/349; 264/DIG. 83; 366/89; 425/203; 425/208; 425/812
[58] Field of Search ............... 264/DIG. 5, DIG. 83, 264/102, 349, 87, 329, 54, 68, 176 R; 425/203, 208, 812; 366/89, 79

[56] References Cited

U.S. PATENT DOCUMENTS

| | | | |
|---|---|---|---|
| 687,915 | 12/1901 | Chambers | 425/208 |
| 2,774,105 | 12/1956 | Bernhardt | 264/102 X |
| 3,150,214 | 9/1964 | Scalora et al. | 264/DIG. 5 |
| 3,263,276 | 8/1966 | Maier | 425/208 |
| 3,268,636 | 8/1966 | Angell | 264/DIG. 83 |
| 3,496,603 | 2/1970 | Listner et al. | 425/208 X |
| 3,650,652 | 3/1972 | Dray et al. | 425/208 X |
| 3,793,416 | 2/1974 | Finkmann et al. | 264/DIG. 83 |
| 3,804,381 | 4/1974 | Bielfeldt et al. | 366/89 X |
| 3,814,779 | 6/1974 | Wiley | 264/DIG. 5 |
| 3,826,477 | 7/1974 | Kunogi et al. | 264/102 X |
| 3,927,160 | 12/1975 | Medley | 264/DIG. 5 |
| 3,937,778 | 2/1976 | Tanaka | 264/102 |
| 3,940,467 | 2/1976 | Brachman | 264/DIG. 83 |
| 3,949,973 | 4/1976 | Bishop et al. | 366/89 X |
| 3,992,500 | 11/1976 | Kruder et al. | 264/102 |
| 4,006,209 | 2/1977 | Chiselko et al. | 264/349 X |
| 4,060,226 | 11/1977 | Schweller | 425/208 X |
| 4,065,532 | 12/1977 | Wild et al. | 425/812 X |
| 4,074,362 | 2/1978 | Kruder et al. | 425/208 X |
| 4,127,635 | 11/1978 | Gauthier | 264/176 R X |

FOREIGN PATENT DOCUMENTS

| | | | |
|---|---|---|---|
| 2311241 | 9/1974 | Fed. Rep. of Germany | 264/349 |
| 2132898 | 11/1972 | France | 425/203 |
| 38-10340 | 6/1963 | Japan | 425/208 |
| 48-14021 | 5/1973 | Japan | 425/203 |
| 51-15075 | 5/1976 | Japan | 425/203 |

OTHER PUBLICATIONS

Whittington, Lloyd R., "Whittington's Dictionary of Plastics," Stamford, Conn., Technomic, ©1968, pp. 179-180.

*Primary Examiner*—Philip Anderson
*Attorney, Agent, or Firm*—Barnes, Kisselle, Raisch & Choate

[57] ABSTRACT

Thermoplastic granules mixed with a blowing agent are processed in a barrel unit which encloses a rotating screw which mixes, works and plasticizes the mixture so that at the leading end of the barrel it is in a molten condition suitable for extrusion or injection molding. The screw has two compression stages with an intermediate decompression stage therebetween. At a location corresponding to the decompression stage of the screw the barrel has a vent therein which permits the escape of moisture vapors and other unwanted volatiles in the mixture. At the vent zone the forward faces of the screw flights are undercut to minimize the discharge of mixture through the vent.

9 Claims, 6 Drawing Figures

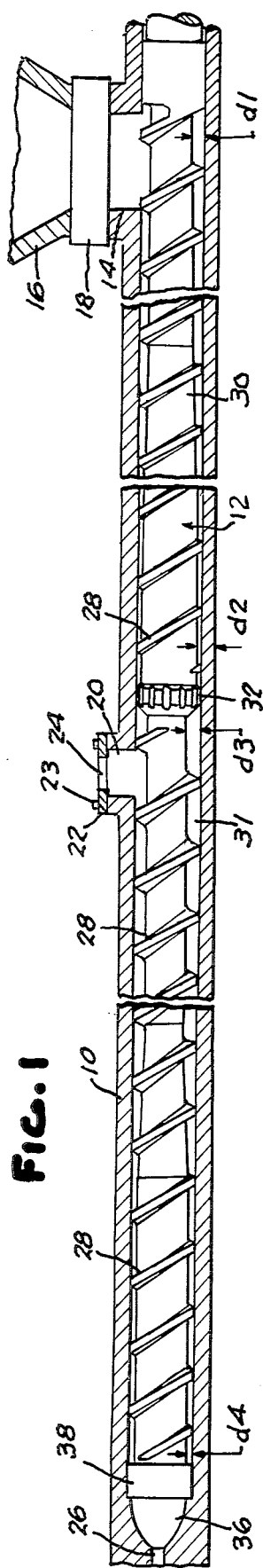
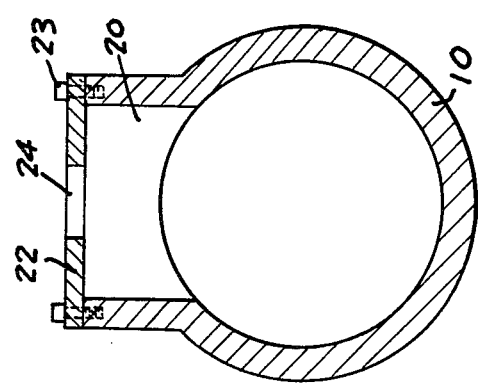
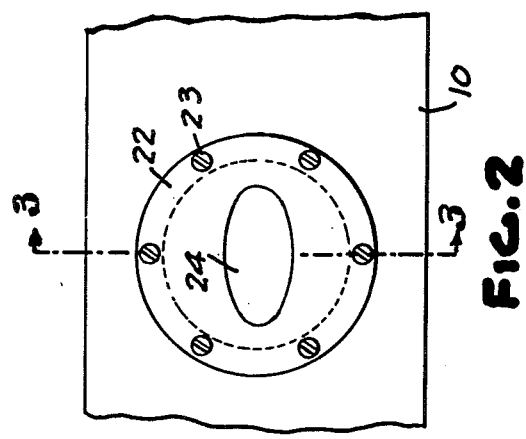
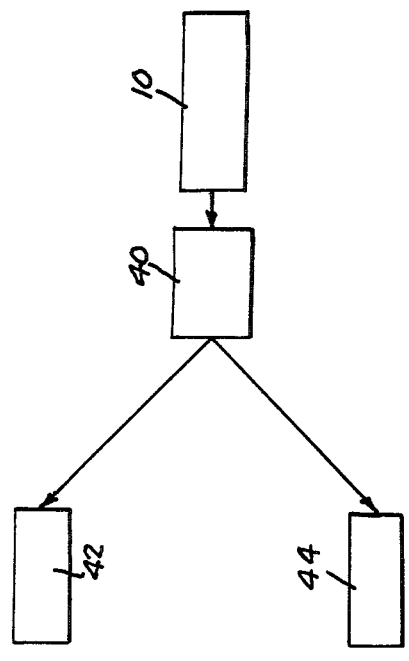

METHOD OF MANUFACTURING STRUCTURAL FOAM PLASTIC PRODUCTS FREE FROM UNDESIRABLE CONTAMINANT CONSTITUENTS

This invention relates to the manufacture of structural plastic foam products, and, more specifically, to a method for producing such products.

The manufacture of structural foam products is well known and has been practiced extensively in the art. Numerous techniques have been employed for the production of such products and articles. Predominant among these is the utilization of extrusion and injection molding of plastic foam.

The compositions utilized for structural (rigid) foam molding purposes may comprise various mixtures of desired thermoplastic resins and either gaseous, liquid or solid blowing agents, the solid and liquid blowing agents being of the type that are thermally decomposable to generate a gas. Usually the thermoplastic mass is fed to an extrusion or injection molding machine in the form of granules with which the blowing agent is intimately admixed and incorporated. When solid blowing agents are employed, the plastic granules may be dusted or coated with the powdery blowing agent in order to constitute the desired foam forming composition.

There are several significant problems involved in the extrusion, and especially injection molding, of foamable thermoplastic compositions. The most common of such problems relates to the fabrication of foam plastics into furnished products having good, and at least substantially uniform, small sized cell structure and other physical characteristics which result in better and more desirable physical and visual properties and enhance end resultant properties. In order to achieve these properties and qualities, excellent and homogeneous mixing is required prior to the final shaping and setting of the foamable mass to secure the maximum effectiveness from the blowing agent gases and/or vapors in their dispersion in and throughout the thermoplastic mass during the heat plastification and working steps of the process. This thorough and homogeneous mixing must all be accomplished preceding discharge of the foamed material from the apparatus in which it is being worked and plasticized.

Experience has demonstrated that foamable compositions, as well as non-foaming plastic masses, are best prepared for fabrication so as to be essentially free from moisture and other volatile deleterious constituents (such as incompletely re-acted monomers, etc. and excessive and unwanted proportions of plasticizer, internal lubricant and similar constituents). Insufficiently "dried" masses frequently result in shaped articles having, amongst other structural defects, an undesirable surface finish appearance, including objectionable "splay" and "spit-mark" effects which are believed to be caused by ulterior evaporation of aqueous and other volatile contaminants in the thermoplastic composition during the final setting of the foamed plastic resin. Attempts to obtain such satisfactory preparation or "drying" have been directed in several different ways.

In one form of preparation the solid comminutated plastic material is fed into a masticating and plasticizing barrel of a screw conveying apparatus which advances the material and conditions it for thermoplasticized ejection (generally in a molten and free-flowing condition) from a hopper unit wherein it is heated to dry it before entry into the plasticizing barrel. In the hopper unit the material is purposely not subjected to so much heat as would tend to soften or cause fusion of the thermoplastic composition. The thermal input is maintained at a value which is only adequate to rid the thermoplastic of water and other undesirable low-boiling volatiles. Thus, in hopper drying the drying temperatures usually employed are on the order of about 180°–185° F.

Hopper drying is often ineffective and inefficient. The heating elements and other components utilized in hopper drying units frequently fail to operate in a good and reliable manner. In addition, when a foam producing composition is involved problems such as caking, agglomeration, etc. of the plastic particles are frequently encountered. This is particularly true where the thermoplastic granules are coated with a blowing agent in finely powdered or granulated form retained in suspension in a liquid carrier. In such instances the drying heat applied in a hopper frequently causes caking and consequent blockage within the hopper assembly and prevents uniform feeding of the plastic granules to the barrel of the apparatus. To preclude or minimize this problem, hopper drying temperatures as low as about 115° F. have been utilized with foamable plastic granules. However, such low temperatures are very inefficient and impractical to accomplish the intended drying purpose. Consequently, efficient and effective drying of foamable plastic granules to achieve best results has been very difficult to accomplish.

Another way in which plastic granules have been treated to rid them of water and other volatile contaminants is to utilize a vent opening in the barrel employed for extrusion or injection molding the thermoplastic mass. A vented barrel molding apparatus normally employs a double stage screw. The screw has a first compression stage extending from the inlet at the upstream end of the barrel followed by a relaxed compression or decompression stage which is then sequentially followed by a second compression stage extending to the end thereof adjacent the outlet of the barrel and through which the plasticized material is discharged. At the relaxed compression or decompression stage of the screw a vent is provided in the barrel through which water, vapor or other volatile constituents escape from the heated thermoplastic being processed. This imparts the desired drying effect to the plastic mass being handled. However, the use of vented barrels with foamable thermoplastic masses has never been considered practical because, to utilize the advantage of such vents, the foamable plastic mass has to be forwarded through the barrel at or near its foaming temperature. Plasticating of the polymer in the barrel in advance of the vent inevitably results in substantial decomposition in the case of chemical blowing agents or volatilization in the case of liquid blowing agents which, upon decompression in the vent zone, would cause the foamed material to expand or extrude out of the vent opening. Moreover, the release or escape of the free gas generated by the blowing agent through the vent wound, on its face, appear to be undesirable. Consequently, in order to avoid appreciable and significant loss of the foamable mixture and the foam-making gaseous constituent composition prior to the discharge thereof from the barrel, vented barrels have never been used for processing foamable plastics.

The present invention has for its object the production of structural plastic foam products, particularly those having dense surface skins encapsulating a foam core, having greatly enhanced visual and better physical properties and characteristics. More specifically, the present invention contemplates the plasticizing of foamable plastic granules through the utilization of a vented barrel from which the plasticized mass is extruded or injection molded.

Further objects, features and advantages of the present invention will become apparent from the following description and accompanying drawings, in which:

FIG. 1 is a somewhat schematic view of a vented barrel assembly for extrusion or injection molding of foamable thermoplastic compositions according to the present invention;

FIG. 1A is a diagrammatic view of a modified form of apparatus according to the present invention;

FIG. 2 is a fragmentary plan view of the vent section of the barrel assembly shown in FIG. 1;

FIG. 3 is a sectional view along the line 3—3 in FIG. 2;

Figure 4:
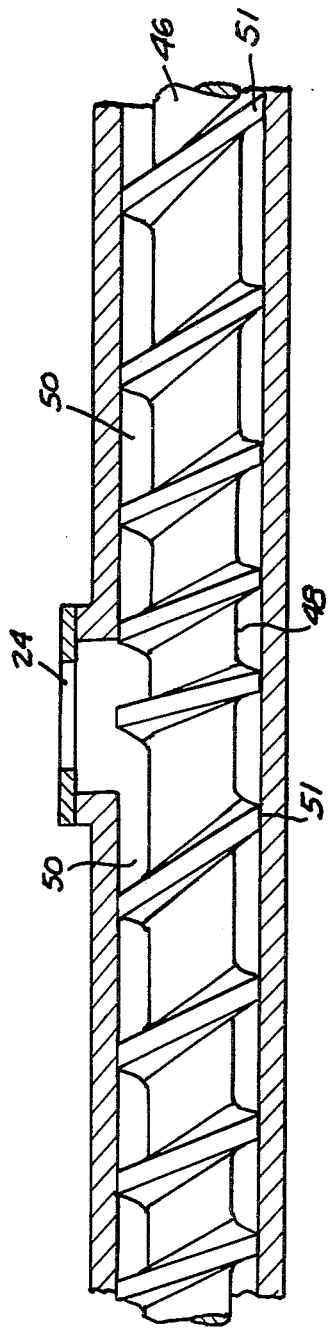
FIG. 4 is a schematic sectional view of a modified form of screw.

Referring first to FIG. 1, the essential parts of a vented barrel assembly are illustrated. The barrel of the extrusion or injection molding apparatus is generally designated 10 and encloses a rotatable screw 12. In the case of an extrusion apparatus, screw 12 normally simply rotates in a fixed axial position. In the case of an injection molding apparatus, screw 12 may be made to rotate as well as shift axially. At one end thereof barrel 10 is provided with an inlet 14 from a hopper 16. Frequently the plastic granules in hopper 16 are dispensed in metered quantities to the inlet 14 by a suitable metering feed device 18 which is normally an auger type of mechanism. At generally the central portion thereof, or at a location spaced slightly forward from the central portion, barrel 10 is provided with a vent passageway 20 having a vent cap 22 removably secured thereto as by screws 23, cap 22 being provided with an opening 24 of the desired size. The forward end of barrel 10 is fashioned with a passageway 26 through which the molten plastic is discharged for either extrusion or injection molding.

It will be noted that screw 12 is fashioned with helical flights 28 extending around a central shaft 30, the plastic material being worked and conveyed in the flutes 31 between flights 28. In the arrangement shown in FIG. 1 the flights 28 have a substantially uniform pitch throughout the length of the screw. However, the depth of the flutes 31 (that is, the radial distance between the outer surface of shaft 30 and the periphery of the flights 28) varies along the length of the screw.

Thus, adjacent the inlet 14 the depth of the flutes (designated $d_1$) is relatively large and diminishes progressively in a downstream direction so that, adjacent the vent section of the barrel, the depth of the flutes (designated $d_2$) is relatively small. At the portion of screw 12 just ahead of the vent section there is provided a blister 32 having shallow axially extending grooves 34 spaced around the periphery thereof. Directly downstream from blister 32 the depth of the flutes (designated $d_3$) is relatively large for a distance of several flights 28 and then progressively diminishes to a relatively shallow depth (designated $d_4$) adjacent the forward end of the screw. The forward end of the screw comprises a tapered nose cone 36 which generally corresponds in shape with the bore of the barrel directly behind discharge passageway 26. Between nose cone 36 and the forwardmost flight of the screw there is arranged a non-return valve 38 which permits the flow of plastic in a direction toward discharge 26, but prevents the flow of plastic along the screw in the opposite direction.

Although not shown in the drawings, either the barrel or the screw can be provided with heating or cooling means, as desired. The extent of such heating or cooling means employed is correlated to the amount of frictional heat imparted to and generated in the particular thermoplastic mass being used by such factors as the working of the screw, frictional heating, etc.

In the block diagram of FIG. 1A an optional operational practice of the invention is illustrated. This involves the intermediate storage of the foamable composition in an accumulator device 40 after it is discharged from a barrel and screw apparatus shown in FIG. 1. The plasticized composition in accumulator 40 is adapted to be discharged in accordance with conventional accumulator practice into an injection mold 42 or through an extrusion die 44. When injection molded articles are being produced, the utilization of an accumulator unit facilitates the achievement of so-called "low pressure" molding in which the pressure of the plastic mass on injection into the mold form is on the order of only about 500 to 5,000 p.s.i. In low pressure molding the size of the shot is somewhat less than the volume of the mold. In so-called "high pressure" injection molding of foamable plastics the plastic material is shot directly from the barrel 10 through a nozzle or the like into the mold at a pressure on the order of at least 10,000 to 20,000 p.s.i. In high pressure injection foam molding the mold cavity is expanded and enlarged at least slightly after the shot is injected. Extrusion moldings are usually produced with a pressure at the forming die of about 300 to 600 p.s.i.

Regardless of whether or not an accumulator unit such as shown at 40 is utilized, the plasticating action produced in barrel 10 is substantially the same. In the first stage of the screw (namely, from the inlet 14 of the barrel to the blister 32 on the screw) the initial mixing and plasticating of the foamable mass is accomplished. By reason of the decreasing depth of the flutes between the screw flights, the plastic material is progressively worked and the temperature thereof raised so that by the time the plastic flows through blister 32 the temperature thereof is sufficiently elevated to thoroughly plasticize the mass and to activate the blowing agent. After the fluid mass is forced through the grooves 34 on blister 32 the pressure thereon is immediately relieved by reason of the comparatively large volume of flutes in this zone. The apparatus is operated so that at this point the mass is at or above the foaming temperature, and, since the pressure thereon is relieved, it is vented of free gases and vapors during its passage through the vent zone of the barrel. Thereafter, as the molten mass is advanced by the screw flights, it is again progressively and increasingly worked and compressed by reason of the decreasing depth of the flutes to further raise the temperature thereof so that, when it reaches the forward end of the barrel, it is in the desired molten condition for discharging through the passage 26. Surprisingly, the efficacy of the blowing agent is not diminished by the intermediate venting action.

In the barrel unit used for injection molding, screw 12 is frequently rotated and permitted to retract, thus causing the molten mass to accumulate ahead of the nose cone 36. A shut off valve (not shown) is sometimes employed to retain the mass accumulated ahead of the nose cone. After the desired quantity of molten plastic is accumulated, screw 12 is displaced forwardly to the position shown in FIG. 1 to thereby inject the molten mass into the die. In such an arrangement screw 12 would be retracted gradually from the position shown in FIG. 1 in order to accumulate the desired shot ahead of nose cone 36. Accordingly, when an axially displaceable screw is employed, it is important that the decompression zone of the screw (the portion where the flutes are relatively deep) extend forwardly of the vent passage 20 so that, in the retracted position of the screw, the plastic being worked adjacent the vent zone is in a decompressed, rather than a compressed, state.

The use of the double stage screw with the intermediate decompression zone results in a better and more homogeneous mixing of the mass during its entire passage through the barrel of the apparatus. This improved mixing produces a better cell structure in the resulting product. However, the mixing is markedly enhanced by the effect of the intermediate venting action on the foamable composition. As a result of the venting action the second stage compression results in an even more perfect and effective mixing of the foamable composition prior to its discharge from the barrel. This improved mixing and venting results in the production of foam plastic parts having superior surface and physical properties. The foam parts are produced with enhanced reliability and tend to be more dimensionally precise. The parts generally exhibit optimum surface appearance by reason of the greatly diminishing occurrence of splay, spit-marks and visual bubbles on the resulting foam product.

One of the important reasons for such improved results obtained with the present invention is believed to be the riddance from the foamed plastic mass of not only unwanted gases, vapors and moisture, but also of large gas bubbles and randomly dimensioned and oversized cellular patterns in the foam structure. This action is somewhat comparable to the sequential kneading requisites for making good bread dough in the baking arts; namely, a second kneading after the dough is permitted to rise. In other words, after the first compressive stage working action on the foamable composition, the included vaporizable material in the mass tends to form irregularly sized and undesirably large bubbles. It is extremely difficult to reduce the contained bubbles or cell sizes by mere physical working in an enclosed and contained mass of foam. However, the intermediate venting action circumvents and minimizes this problem to a large extent. After passing through the vent zone the foamable mass has considerably better cell distribution and dispersion before being discharged from the barrel for ultimate shaping. This results from the above-explained combined effect of the venting action with the better mixing and more thorough rechurning of the plastic mass which is made possible by the double stage screw and vented barrel apparatus.

In accordance with the present invention the foamable composition is at least commencing to "blow" or foam by the time it reaches the venting area in the barrel. The mass is in the foaming condition by reason of its temperature having been raised by the applied and/or frictional heating effects to a value such that the blowing agent is thermally activated to produce the desired gas. However, because the foamable mixture is under substantial compression in the first compression zone, having been worked into the shallow flutes ($d_2$), the mixture will not foam or expand until it reaches the decompression zone ($d_3$) which is generally at or near atmospheric pressure. This partial or primary blow within the vent zone of the barrel allows some expansion of the foamable composition in the relatively deep flutes ($d_3$) at the vent zone and at the actual point of venting, i.e. the vent opening 24. During venting some of the volatile constituents escape through the vent and have the effect of drying the foamable composition. Thereafter, the final compression, working and mastication of the mass downstream of the vent recompresses the pre-expanded mixture which is then kept under pressure in the barrel to prevent re-expansion until it is discharged from the barrel through passageway 26. Surprisingly this pre-expansion and subsequent re-compression yields a better over-all product with a more uniform cell structure than would result if the first true "blow" of the foamable composition occurred upon discharge from the barrel.

In the arrangement shown in FIG. 1 the progressively increasing working and compression of the mass of plastic is achieved by designing the screw so that the depth of the flutes becomes progressively less at the first and second compression stages of the screw. The decompression of the mass at the vent zone is obtained by making the depth of the flutes relatively great at this zone. It will be appreciated that this two-stage compression with an intermediate venting action can be accomplished in other ways. For example, in FIG. 4 the shaft portion 46 of screw 48 is of generally uniform diameter throughout its length. Thus, the depth of flutes 50 is substantially constant. The progressively increasing compression and working of the mass is accomplished by changing the lead of the screw flights 51 along the length of the screw. Thus, the flights have a progressively decreasing pitch in the two compressive zones and a progressively increasing pitch in the vent zone. Stated differently, since the diameter of the shaft portion is substantially constant, the screw is designed so that the width of the flutes becomes progressively less in the two compression stages and is relatively greater in the vent zone. It follows, of course, that the two stage screw can also be designed wherein both the pitch of the flights and the depth of the flutes can both vary to accomplish the desired result.

In order to obtain the desirable venting action described above, it is important that the vent zone be so located that the plastic mass exposed to the vent has been heated to a temperature at which the undesirable constituents in the mass are volatized and escape through the vent. In other words, the plastic mass must be subjected to considerable working and compression before it reaches the vent zone. As a practical matter, the vent zone should be located at least generally centrally between the ends of the working portion of the screw or slightly downstream from this central zone. This insures that the plastic mass will be masticated and compressed sufficiently by the time it reaches the vent zone to permit the escape of the volatiles and pre-expansion of the mixture. In this connection it will be apparent that, in view of the double stage compression with the intermediate decompression of the foamable mass, the length-to-diameter ratio of the barrel must be relatively high. This ratio (commonly referred to as the L/D ratio) is normally in excess of 20 to 1; a ratio of at least 24 to 1 is preferred and a ratio as high as 28 or 30 to 1 being most advantageous. With high L/D ratios better mixing and more uniformity in the foam product results. Contrary to normal expectations, the effectiveness of the blowing agent with respect to achieving the desired foaming action is not destroyed. The effectiveness of the blowing gas is retained until the foamable mass is discharged from the apparatus.

It is obvious, of course, that the overall efficiency of the process described herein depends to some extent upon the amount of foamable material discharged through the vent. The amount of material discharged through the vent depends to a large extent on the space in the barrel available for pre-expansion and, more specifically, the space provided by the deeper flutes ($d_3$) in the vent zone. If the space available in the vent zone between the flights of the screw is not substantial, then a greater portion of the foamed mixture will, of necessity, extrude out the opening 24. The amount discharged through the vent can also be controlled to some extent by the size and location of the vent opening 24. The area of opening 24 is not critical in relation to the action produced by the vent zone. The primary importance of the size of this opening relates to the amount of foam material that is permitted to discharge through the vent. Naturally this opening will vary in size depending upon different compositions used. Some compositions will tend to foam much more profusely than others. The area of opening 24 is, at all event, substantially less than one-half the cross sectional area of the bore in the barrel, preferably on the order of 20 to 30% of the cross sectional area of the bore. However, the opening should not be so small as to restrict the venting of the gaseous vapors therethrough as a result of being plugged by the escaping foam material.

Figure 5:
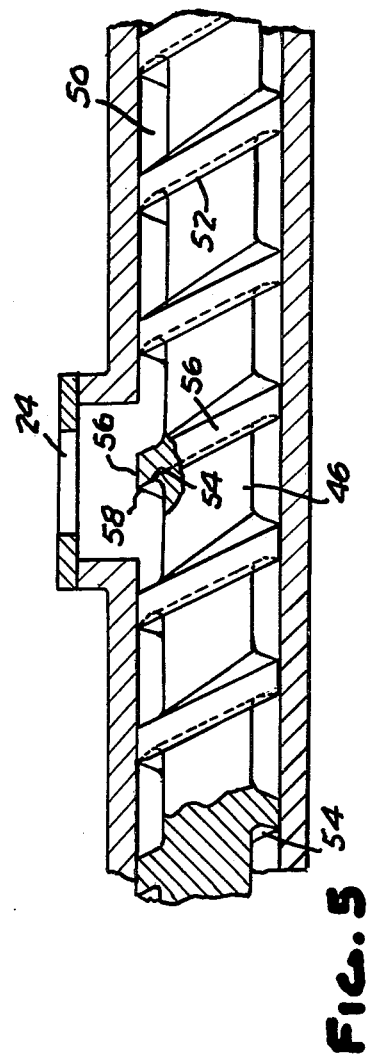
FIG. 5 is a schematic sectional view of another modified form of screw.

The amount of the foamable plastic mass discharged through the vent is dependent not only upon the size of the vent, but also upon the processing conditions. The discharge of the foam mass through the vent can be reduced by lowering the feed rate of the plastic material to the screw and also by lowering the temperature of the mass in the vent zone so that not more than 5% of the material passing through the barrel is discharged through the vent. The amount of plastic material discharged through the vent can also be appreciably diminished by the configuration of the flights of the screw. An extremely effective way to control and minimize the discharge of foam material through the vent opening is by undercutting the leading face 52 of the screw flights in the area of the vent. The undercutting should be such as to present a concave leading surface on the screw flight. Thus, as shown in FIG. 5, in the vent zone the screw flights 50 are formed with a concavity 54 on the leading face thereof which intersects the flight land 56 in substantially a knife edge 58. This tends to direct the material radially inwardly toward the shaft portion 46 of the screw rather than radially outwardly. Consequently, while the volatile gases are expelled through the vent, there is little tendency for the plastic mass itself to flow radially outwardly through the vent. The concave portions of the screw can vary in configuration as long as they tend to scoop the material inwardly. Thus, adjacent the outer periphery of the forward face the concavity should slope rearwardly to form a sharp acute angle wedge rather than being inclined forwardly or being perpendicular to the axis of shaft portion 46. In this manner, the dished or cupped portions 54 on the leading face of the screw flights will tend to retain the material within the flutes around the shaft portion of the screw as the material advances past the vent zone. It will be understood, of course, that strength consideration may require screw flights having a wider land when the concavities 54 are formed in the leading faces thereof.

Most blowing agents, both liquid and solid, are activated to produce a gas over a somewhat broad range of temperatures. The actual range of blowing temperatures varies with different blowing agents and the composition of the plastic resin. For example, some additives tend to reduce the blowing temperature range. In any event, in accordance with the present invention the plastic mixture is caused to reach the foaming temperature of the blowing agent-resin mixture (preferably a temperature adjacent the lower end of the range) as the mixture passes the vent. At this temperature contaminants (including moisture) in the mixture are volatized and permitted to escape through the vent without destroying the effectiveness of the blowing agent.

I claim:
1. The method of making structural foam plastic products which comprises:
    (a) mixing a granular thermoplastic resin and a heat activated blowing agent to form a foamable granular mixture containing thermally activatable gas and vapor-forming constituents which include both undesirable contaminant constituents, such as water and low-boiling point impurities, as well as desired blowing and cell-forming gaseous constituents;
    (b) feeding said granular mixture from a hopper to a first compressive working and heating zone located at the inlet at one end of a barrel-enclosed, screw-advancing, two stage plasticating apparatus wherein the granular mixture is plasticated and heated to a temperature at which said blowing constituents at least being to vaporize and form gases to thereby produce a molten foamable thermoplastic resin mixture;
    (c) advancing said plasticated and heated mixture from said first zone by means of said screw to a selective venting and a decompression second zone of said apparatus wherein the compression on the mixture is relieved and said undesirable contaminent constituents are substantially vented from the mixture without substantial loss of the molten foamable thermoplastic resin mixture;
    (d) advancing said vented mixture by means of said screw to a third zone of said apparatus wherein the mixture is again subjected to compression, working and heating to further raise the temperature thereof and to plasticate the mixture to a more fluid foamable condition; and
    (e) thereafter discharging the foaming mixture from said third zone through suitable means for forming the foamed mixture into a structural foam plastic product.

2. The method called for in claim 1 wherein said last-mentioned step comprises injecting the foaming mixture into a mold.

3. The method called for in claim 1 wherein the mixture is retained in said first zone for a period of time at least as long as the mixture is in the third zone.

4. The method called for in claim 1 wherein the mixture is subjected to working in the second zone for a substantially shorter period of time than in said first zone.

5. The method called for in claim 1 wherein said mixture is vented in said second zone through an opening in the barrel of the apparatus and the portion of the screw flites which traverse the vent opening are undercut on the leading face thereof in order to tend to prevent said mixture which is being conveyed by said flites from being displaced outwardly through said vent opening.

6. The method called for in claim 1 wherein said mixture is permitted to expand in said second zone so that a small portion thereof is discharged through said vent opening along with the vented vaporized constituents.

7. The method called for in claim 6 wherein the size of said opening is correlated with the temperature and the rate at which the mixture is advanced through said first zone such that not more than about 5% by weight of the mixture is discharged through said vent opening.

8. The method called for in claim 1 wherein the blowing agent is activated to produce a gas over a range of temperatures and the plastic mass is worked and heated in said first zone so that the temperature thereof is at the lower end of said range when it is advanced through said second zone.

9. The method called for in claim 1 wherein the mixture is heated to a higher temperature and is compressed to a greater degree in the third zone of said apparatus than in the first zone.

* * * * *